United States Patent Office 2,952,711
Patented Sept. 13, 1960

2,952,711

HEXAHALOCYCLOPENTADIENE-DIVINYLBENZENE ADDUCTS AND METHOD OF MAKING

Carleton W. Roberts, Midland, Mich., assignor to The Dow Chemical Company, Midland, Mich., a corporation of Delaware No Drawing. Filed Feb. 27, 1958, Ser. No. 717,812

8 Claims. (Cl. 260—649)

This invention concerns new halogenated polycyclic hydrocarbons obtained by reaction of hexahalocyclopentadiene with divinylbenzene. It relates more particularly to the addition reaction products of hexahalocyclopentadiene with meta- and para- divinylbenzene and pertains to a process for making the compounds.

It is known to prepare Diels-Alder reaction products of hexahalocyclopentadiene with unsaturated organic compounds. U.S. Patent No. 2,606,910 reacts styrene and hexachlorocyclopentadiene to obtain the corresponding polycyclic adduct of hexachlorocyclopentadiene and styrene in a mole ratio of 1:1.

However, it has not heretofore been known to prepare Diels-Alder reaction products of hexahalocyclopentadiene and divinylbenzene.

It is an object of this invention to provide new polyhalogenated polycyclic hydrocarbons by reaction of hexahalocyclopentadiene and divinylbenzene, which products possess a high percentage of halogen and other valuable characteristics. Another object is to provide a process for making Diels-Alder reaction products of hexahalocyclopentadiene and divinylbenzene. A specific object is to provide new poly-chlorine-containing polycyclic adducts of hexachlorocyclopentadiene and meta- and para-divinylbenzene.

According to the invention the foregoing and related objects are obtained by the addition reaction of two molecular proportions of a hexahalocyclopentadiene such as hexachlorocyclopentadiene or hexabromocyclopentadiene with one molecular proportion of divinylbenzene, e.g. meta-divinylbenzene, para-divinylbenzene or a mixture of such isomeric divinylbenzenes. More particularly the compounds of the invention may be represented by the product produced in accordance with the following equation:

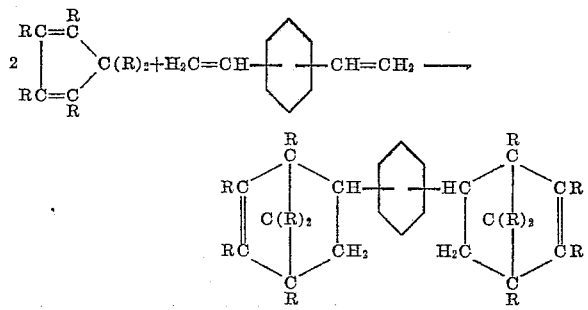

wherein R represents a chlorine or bromine atom and the halogen-containing polycyclic radicals are attached to the benzene nucleus in positions meta- and para- to one another. The compounds are the isomeric meta- and para-bis (1,4,5,6,7,7 - hexahalobicyclo [2.2.1] - 5-hepten-2-yl) benzenes of the above formula and mixtures of the meta- and para- isomers wherein the halogen is chlorine or bromine.

The hexahalocyclopentadiene starting material can be hexachlorocyclopentadiene or hexabromocyclopentadiene and is usually employed in a stoichiometric proportion or a slightly greater than stoichiometric proportion than is required to react with the divinylbenzene starting material.

The divinylbenzene starting material can be pure or substantially pure divinylbenzene or a commercial grade of divinylbenzene containing from 25 to 55 percent by weight or more of divinylbenzene in admixture with usual diluents associated with its manufacture. The divinylbenzene is preferably free from other ethylenically unsaturated organic compounds which react with the hexahalocyclopentadiene to form by-products in the reaction since this results in lower yields of the desired product, based on the hexahalocyclopentadiene consumed. The divinylbenzene is usually obtained as a mixture of the meta- and para- isomers in proportions of from about 60 to 70 percent by weight of meta-divinylbenzene and from 40 to 30 percent of para-divinylbenzene.

The reaction can be carried out at temperatures between about 70° and 180° C., preferably from 90° to 150° C. and at atmospheric, subatmospheric or superatmospheric pressures, but is preferably carried out at atmospheric pressure or thereabout, e.g., at from atmospheric pressure up to about 50 p.s.i. guage pressure.

In preparing the compounds of the invention the reaction can be carried out by heating a mixture of the reactants alone or by adding the divinylbenzene to the hexahalocyclopentadiene at a reaction temperature, but the exothermic reaction is difficult to control and results in the formation of substantial amounts of by-products with resultant lower yields of the desired product. For these reasons the reaction is usually carried out while having the reactants dissolved or dispersed in an organic liquid having a boiling point between 60° and 200° C. and which is inert with respect to the reactants and reaction products. Examples of suitable organic liquids are saturated aliphatic hydrocarbons such as hexane, heptane, octane, nonane, or petroleum ether, and aromatic hydrocarbons or nuclear halogenated aromatic hydrocarbons, e.g. benzene, toluene, xylene, cumene, ethylbenzene, diethylbenzene, ethyltoluene, chlorbenzene, orthodichlorobenzene, chlorotoluene, chloroethylbenzene, chloroxylene and the like. The organic liquid or solvent is employed in an amount sufficient to form a solution or slurry which can conveniently be stirred.

In practice, the hexahalocyclopentadiene is dissolved or dispersed in a suitable inert liquid organic compound, e.g. toluene or n-heptane, in a reaction vessel. The mixture is stirred and heated to a temperature between 70° and 180° C., suitably to a refluxing temperature of the mixture, and the divinylbenzene is added. The divinylbenzene is preferably added in small portions or gradually and in amount not exceeding a stoichiometric proportion, i.e. an amount not greater than one gram molecular proportion of the divinylbenzene per two gram molecular proportions of the hexahalocyclopentadiene initially used. The divinylbenzene is usually added in an amount somewhat less than the stoichiometric proportion required to react with the hexahalocyclopentadiene since any excess divinylbenzene polymerizes in the reaction and renders it difficult to recover the product. After adding the desired amount of the divinylbenzene, either alone or in admixture with an inert diluent, e.g. ethylbenzene or n-heptane, to the solution of the hexahalocyclopentadiene in the inert liquid in the reaction vessel, the resulting mixture is stirred and maintained at reaction temperatures for a period sufficient to complete or substantially complete the reaction. In general, the reaction proceeds more rapidly with increase in temperature within the range stated, but is dependent in part upon the proportion of solvent employed. The reaction is usually complete in a period of from 4 to 36 hours at temperatures between about 90° and 120° C. Upon completing the reaction the mixture is cooled to crystallize the product, or if crystallization of the product does not occur, the solvent or a portion thereof is distilled, suitably by heating the mixture at a temperature not substantially above 140° C. and under subatmospheric pressure, if required, sufficient to distill the solvent, then cooling the residue or slurry to crystallize the product. The product is separated in usual ways, e.g. by filtering or centrifuging and is washed and dried. The product can be further purified by recrystallization from a solvent.

The product is obtained as a mixture of the isomeric meta- and para-bis(1,4,5,6,7,7-hexahalobicyclo [2.2.1]-5-hepten-2-yl)benzenes corresponding substantially to the mixture of the isomeric meta- and para- divinylbenzenes in the starting material and the hexahalocyclopentadiene used, i.e. whether hexachlorocyclopentadiene or hexabromocyclopentadiene. The mixtures of the isomeric meta- and para-bis(1,4,5,6,7,7-hexachlorobicyclo [2.2.1]-5-hepten-2-yl)benzenes are white crystalline materials melting at temperatures between about 140° and 180° C., depending upon the relative proportions of the meta- and para- isomers in the mixture. The product is usually obtained as a mixture of the meta- and para- isomers melting at temperatures between about 170° and 180° C., although the pure meta- and para- compounds melt at temperatures which are above the melting points of mixtures of the isomers. The meta-bis(1,4,5,6,7,7-hexachlorobicyclo [2.2.1]-5-hepten-2-yl)benzene melts at temperatures between 210° and 215° C., and the para-bis(1,4,5,6,7,7-hexachlorobicyclo [2.2.1]-5-hepten-2-yl)-benzene melts at temperatures between about 285° and 295° C. The pure meta- and para- compounds can be separated from the mixture of the isomeric compounds in usual ways, e.g. by fractional crystallization of the compounds from a solvent. The meta- and para- compounds can be recovered from the reaction mixture in which they are prepared in the presence of an inert liquid solvent by cooling the mixture to obtain a first crop of crystalline product consisting principally of the para-isomer, then separating this material from the liquid and recrystallizing it from a solvent to obtain the pure para-isomer. The mother liquor from the recrystallization of the para-isomer is evaported to dryness or is concentrated and cooled to obtain the meta-isomer in pure or substantially pure crystalline form which can be further purified by recrystallization from a solvent.

The meta- and para-bis(1,4,5,6,7,7-hexachlorobicyclo [2.2.1]-5-hepten-2-yl)benzenes and mixtures of the isomeric compounds are white crystalline materials which are non-toxic as determined by biological tests. They are compatible with many thermoplastic resins and are useful as plasticizers and flame-proofing or fire retarding agents for thermoplastic resins such as polystyrene, copolymers of styrene and acrylonitrile, copolymers of styrene and from 2 to 10 percent by weight of rubber or compositions which are blends of such resinous polymers and from 5 to 35 percent by weight of natural or a synthetic rubber. The compounds are soluble in most organic liquids, e.g. aliphatic and aromatic hydrocarbons, and are useful as agents for increasing the fire resistance of lacquers, varnish and resin base paints. The fungicidal activity of the adduct of hexachlorocyclopentadiene and meta- or para-divinylbenzene toward a variety of fungi is relatively high. The compounds are useful as the active ingredient, either alone or in association with other toxicants, in compositions which may be utilized in the form of oil sprays, dusts or aqueous emulsions for the control of fungi, or for the killing of weeds and the sterilization of soil with regard to plant growth.

The following examples illustrate ways in which the principle of the invention has been applied, but are not to be construed as limiting its scope.

EXAMPLE 1

A charge of 900 grams (3.3 moles) of hexachlorocyclopentadiene and 1000 ml. of toluene were placed in a glass reaction vessel equipped with a reflux condenser and stirrer. A charge of 264 grams of a commercial grade of divinylbenzene, containing 55 percent by weight of a mixture of about 35 percent para-divinylbenzene and 65 percent meta-divinylbenzene, was added at room temperature. The mixture was stirred and slowly heated to its reflux temperature, then was heated at reflux, about 119° C., for a period of 4 hours. The treated mixture was allowed to cool to room temperature and stand for about 16 hours. A crystalline material separated from the liquid. The crystalline material was separted by filtering. It was recrystallized from n-heptane and was washed and dried. There was obtain 53 grams of para-bis(1,4,5,6,7,7 - hexachlorobicyclo [2.2.1]-5-hepten-2-yl) benzene as a white crystalline product melting at 288°–291° C. The filtrate from the recrystallization of the para-bis(1,4,5,6,7,7-hexachlorobicyclo [2.2.1]-5-hepten-2-yl)benzene was evaporated to dryness. There was obtained 32.5 grams of meta-bis(1,4,5,6,7,7-hexachlorobicyclo [2.2.1]-5-hepten-2-yl)benzene as a white crystalline product melting at 213°–215° C. The filtrate from the reacted mixture was partially evaporated, then cooled to obtain a crystalline material which was separated by filtering. It was recrystallized from n-heptane to obtain 65 grams of meta-bis(1,4,5,6,7,7-hexachlorobicyclo [2.2.1]-5-hepten-2-yl)benzene as white crystals melting at a temperature of 215° C. The filtrates from the crystallizations were combined and the solvent evaporated. There was obtained 251 grams of a while solid melting at temperatures between 170° and 175° C. This crystalline product was a mixture of the meta- and para-bis(1,4,5,6,7,7-hexachlorobicyclo [2.2.1]-5-hepten-2-yl) benzenes. The amounts of the chystalline products obtained in the example and the analysis of the products are reported in the following table.

Table 1

| Fraction No. | Weight, gms. | Melting Point, ° C. | Carbon, percent | Hydrogen, percent | Chlorine, percent |
|---|---|---|---|---|---|
| 1 | 53 | 288–291 | 35.72 | 1.51 | 62.20 |
| 2 | 97.5 | 213–215 | 35.35 | 1.48 | 62.63 |
| 3 | 251 | 170–175 | 35.52 | 1.56 | 62.56 |
| Theoretical | | | 35.50 | 1.48 | 63.02 |

EXAMPLE 2

A charge of 2727 grams (10 moles) of hexachlorocyclopentadiene and 5 liters of n-heptane was placed in a glass reaction vessel equipped with a reflux condenser and stirrer. The mixture was stirred and heated to its reflux temperature. Thereafter, 743 grams of a divinylbenzene fraction containing 75 percent by weight of a mixture of isomeric meta- and para-divinylbenzenes in proportions of about 65 percent by weight of the meta-divinylbenzene and 35 percent of the para-divinylbenzene, was added over a period of 1.5 hours. The resulting mixture was stirred and maintained at a reflux temperature for a period of 35 hours, then was cooled to a temperature of 5° C. A crystalline material separated from the liquid. The crystalline material was separated by filtering and was washed and dried. The filtrate was concentrated and cooled to obtain a further quantity of crystalline product. There was obtained a total of 2437 grams of meta- and para-bis(1,4,5,6,7,7-hexachlorobicyclo [2.2.1]-5-hepten-2-yl)-benzenes as a white crystalline product melting at 168°–171° C. The yield of said product was 84.2 percent based on the divinylbenzene initially used.

EXAMPLE 3

A charge of 900 grams (3.3 moles) of hexachlorocyclopentadiene and one liter of toluene was placed in a glass reaction vessel equipped with a reflux condenser and stirrer. The mixture was stirred and heated to a temperature of 100° C. Thereafter, 264 grams of a commercial grade of divinylbenzene containing 55 percent by weight of a mixture of about 65 percent meta-divinylbenzene and 35 percent para-divinylbenzene was added over a period of 30 minutes. The resulting mixture was stirred and maintained at a refluxing temperature, about 115–119° C. for a period of 4 hours. Thereafter, most of the toluene was removed by distilling the same at a reduced pressure. The residual slurry was mixed with one liter of n-heptane and was stirred and cooled in an ice bath. The crystalline product was separated by filtering and was washed with pentane, then dried in an oven at 100° C. for 8 hours under an absolute pressure of about 10 millimeters. There was obtained 637 grams of product as white crystals melting at 150°–155° C. The product contained 35.56 percent by weight of carbon, 1.44 percent of hydrogen and 62.63 percent of chlorine by analysis. It was a mixture of meta- and para-bis(1,4,5,6,7,7-hexachlorobicyclo [2.2.1]-5-hepten-2-yl)benzenes.

By substituting hexabromocyclopentadiene for the hexachlorocyclopentadiene in the above example the corresponding meta- and para-bis(1,4,5,6,7,7-hexabromobicyclo [2.2.1]-5-hepten-2-yl)benzenes are obtained.

EXAMPLE 4

A purpose of this example is to illustrate a utility for the new compounds as fire retardants in resinous compositions. In each of a series of experiments a charge of molding grade polystyrene and the mixed meta- and para-bis(1,4,5,6,7,7-hexachlorobicyclo [2.2.1]-5-hepten-2-yl)benzenes obtained in Example 3, in proportions as stated in the following table, was compounded on a pair of laboratory rolls at a temperature of 170° C. for a period of 20 minutes to form a homogeneous composition. Molded test pieces of the composition were prepared and tested for flammability of the plastic employing a procedure similar to that described in ASTM D635–44. Table II identifies the compositions and gives the proportion of the meta- and para-bis(1,4,5,6,7,7-hexachlorobicyclo [2.2.1]-5-hepten-2-yl)benzene employed in making the same, identified as "adduct." The table also gives the flammability determined for the composition.

Table II

| Run No. | Polystyrene, percent | "Adduct," percent | Remarks |
|---|---|---|---|
| 1 | 95 | 5 | Burns slowly. |
| 2 | 90 | 10 | Do. |
| 3 | 80 | 20 | Self extinguishes. |
| 4 | 70 | 30 | Do. |
| 5 | 50 | 50 | Do. |

The new compounds of the present invention are effective as herbicides for the killing of weeds and the sterilization of soil with regard to plant growth. They are also effective as fungicides and are adapted to be employed for the control of such fungal organisms as *Rhizoctonia solani*. For such use the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of wetting, dispersing or emulsifying agents. In representative operations, good controls of the growth of the seeds and emerging seedlings of wild oats have been obtained with the meta- and para-bis(1,4,5,6,7,7-hexachlorobicyclo [2.2.1]-5-hepten-2-yl)benzenes when applied at the rate of 50 pounds per acre to soil previously planted with said plant species.

I claim:

1. A chemical compound of the class consisting of meta- and para-bis(1,4,5,6,7,7-hexahalobicyclo [2.2.1]-5-hepten-2-yl)benzene and mixtures of said isomeric compounds, wherein the halogen atoms are selected from the group consisting of chlorine and bromine.

2. Meta-bis(1,4,5,6,7,7-hexachlorobicyclo [2.2.1]-5-hepten-2-yl)benzene having a melting point between 210° and 215° C.

3. Para-bis(1,4,5,6,7,7-hexachlorobicyclo [2.2.1]-5-hepten-2-yl)benzene having a melting point between 285° and 295° C.

4. A mixture of meta- and para-bis(1,4,5,6,7,7-hexachlorobicyclo [2.2.1]-5-hepten-2-yl)benzenes having a melting point between 140° and 180° C.

5. A process for making a bis(1,4,5,6,7,7-hexahalobicyclo [2.2.1]-5-hepten-2-yl)benzene which comprises reacting a hexahalocyclopentadiene of the class consisting of hexachlorocyclopentadiene and hexabromocyclopentadiene with divinylbenzene at temperatures between 70° and 180° C. and separating the bis(1,4,5,6,7,7-hexahalobicyclo [2.2.1]-5-hepten-2-yl)benzene from the reaction mixture.

6. A process for making a bis(1,4,5,6,7,7-hexahalobicyclo [2.2.1]-5-hepten-2-yl)benzene which comprises reacting a hexahalocyclopentadiene of the class consisting of hexachlorocyclopentadiene and hexabromocyclopentadiene with a member of the group consisting of meta-divinylbenzene, para-divinylbenzene and mixtures thereof, at temperatures between 70° and 180° C. while having the reactants dissolved in an inert liquid organic compound boiling at temperatures between 60° and 200° C.

7. A process for making a bis(1,4,5,6,7,7-hexachlorobicyclo [2.2.1]-5-hepten-2-yl)benzene which comprises reacting hexachlorocyclopentadiene with a member of the group consisting of meta-divinylbenzene, para-divinylbenzene and mixtures thereof at temperatures between 70° and 180° C. while having the reactants dissolved in an inert liquid organic compound boiling at temperatures between 60° and 200° C.

8. A process for making a bis(1,4,5,6,7,7-hexachlorobicyclo [2.2.1]-5-hepten-2-yl)benzene which comprises reacting hexachlorocyclopentadiene with a mixture of meta- and para-divinylbenzene at temperatures between 70° and 180° C. while having the reactants dissolved in an inert liquid organic compound boiling at temperatures between 60° and 200° C.

References Cited in the file of this patent

UNITED STATES PATENTS 2,606,910     Herzfeld et al.     Aug. 12, 1952